United States Patent
Furstenberg et al.

(10) Patent No.: US 10,690,933 B2
(45) Date of Patent: Jun. 23, 2020

(54) SPECKLE REDUCTION INSTRUMENT

(71) Applicant: The Government of the United States of America, as represented by the Secretary of the Navy, Arlington, VA (US)

(72) Inventors: Robert Furstenberg, Burke, VA (US); Chris Kendziora, Burke, VA (US); R. Andrew McGill, Lorton, VA (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 15/946,858

(22) Filed: Apr. 6, 2018

(65) Prior Publication Data

US 2018/0292669 A1  Oct. 11, 2018

Related U.S. Application Data

(60) Provisional application No. 62/482,646, filed on Apr. 6, 2017.

(51) Int. Cl.
*G02B 27/48* (2006.01)
*G02B 27/09* (2006.01)
*G02B 5/02* (2006.01)

(52) U.S. Cl.
CPC ........... *G02B 27/48* (2013.01); *G02B 5/0284* (2013.01); *G02B 27/0983* (2013.01); *G02B 27/0994* (2013.01)

(58) Field of Classification Search
CPC .. G02B 27/48; G02B 27/0994; G03B 21/204; F21V 7/06
See application file for complete search history.

(56) References Cited

U.S. PATENT DOCUMENTS

| | | | |
|---|---|---|---|
| 2010/0165307 A1* | 7/2010 | Mizushima | G02B 26/105 353/98 |
| 2011/0013145 A1* | 1/2011 | Kato | G02B 27/0994 353/20 |
| 2011/0044046 A1* | 2/2011 | Abu-Ageel | F21K 9/00 362/259 |
| 2012/0320355 A1* | 12/2012 | Maeda | G03B 21/2013 355/67 |
| 2015/0062903 A1* | 3/2015 | Hu | G03B 21/204 362/259 |
| 2018/0180251 A1* | 6/2018 | Tian | G03B 21/14 |

\* cited by examiner

*Primary Examiner* — Cara E Rakowski
*Assistant Examiner* — Christopher A Lamb, II
(74) *Attorney, Agent, or Firm* — US Naval Research Laboratory; Rebecca L. Forman

(57) ABSTRACT

A speckle reduction instrument having a parabolic reflector and flat mirror to form a cavity-based unit. Laser light is collected and bounced around the cavity hitting a diffuser surface multiple times. The laser light that is highly coherent is converted into less-coherent but still bright light suitable for illumination in microscopes and other devices. Also disclosed is the related method for reducing speckle.

16 Claims, 4 Drawing Sheets

$$r_i = d_i + \sqrt{(x_{pix} - x_i)^2 + (y_{pix} - y_i)^2 + (z_{pix} - z_i)^2}$$

$$E_{pix} = E_0 \sum_{i=1}^{N_{scatterers}} \exp\left(i2\pi \frac{r_i}{\lambda}\right)$$

$$I_{pix} = |E_{pix}|^2$$

FIG. 2B

SPECKLE REDUCTION INSTRUMENT

PRIORITY CLAIM

The present application is a non-provisional application claiming the benefit of U.S. Provisional Application No. 62/482,646 filed on Apr. 6, 2017 by Robert Furstenberg et al., entitled "SPECKLE REDUCTION INSTRUMENT," the entire contents of which is incorporated herein by reference.

CROSS REFERENCE

Cross reference is made to application Ser. No. 15/946,844, filed contemporaneously herewith, entitled LASER SPECKLE REDUCTION AND PHOTO-THERMAL SPECKLE SPECTROSCOPY, by Robert Furstenberg et al., the disclosure and contents of which are incorporated herein by reference in its entirety.

BACKGROUND OF THE INVENTION

Field of the Invention

The present invention relates to laser speckle reduction, and more particularly to a high-throughput speckle reduction device.

Description of the Prior Art

Due to their high brightness, infrared (IR) lasers (such as tunable quantum cascade lasers (QCLs)) are very attractive illumination sources in both stand-off spectroscopy and micro-spectroscopy. In fact, they are the enabling device for trace-level spectroscopy. However, due to their high coherence as laser beams, QCLs can cause speckle, especially when illuminating a rough surface. This is highly detrimental to the signal-to-noise ratio (SNR) of the collected spectra and can easily negate the gains from using a high brightness source. In most cases, speckle reduction is performed at the expense of optical power.

When coherent light (such as light from a laser source) illuminates a rough surface, the resulting image contains a granular pattern called speckle (Goodman, Speckle Phenomena in Optics, Roberts & Company, Englewood Colo. (2007)). A typical speckle pattern is shown in FIG. 1. The speckle grain size and distances from neighboring grains is often very sensitive to changes in sample geometry, optical configuration, and wavelength of light used. Speckle can be modeled by considering the speckle pattern to be due to interference from a collection of scattering centers. FIGS. 2A and 2B illustrate this concept.

In many applications, speckle is a nuisance as it obfuscates the real signal (e.g. reflectance, transmittance etc.) from the sample. Depending on the speckle contrast (as defined by the fluctuations of speckle intensity), it can reach levels where the signal to noise ratio of the detection system is speckle limited. Therefore, it is imperative to reduce speckle contrast but without an associated reduction in signal-to-noise due to lower laser power throughput. This is very hard to do as "de-speckling" invariably comes with a decrease in the optical power of the de-speckled laser light. Ideally, a speckle-reduction optical setup will allow for tuning the amount of speckle reduction.

There are several strategies for reducing speckle. Spatial averaging involves combining multiple pixels to wash-out speckle contrast. Temporal averaging involves collecting signal over a longer time or combining consecutive camera frames. Spectral averaging involves reducing spectral resolution by smoothing, which reduces speckle contrast. Polarization averaging involves combining the signal from illuminating with two polarization states of the laser. A de-speckling procedure can involve a coherent illumination wavefront becoming an incoherent wavefront.

A related speckle reduction unit that combines a spinning diffuser with a multi-mode fiber (see cross reference information above) has a good speckle reduction performance, but it comes at the expense of optical throughput (only ~2.5%). This may be sufficient for microscopy applications, but for stand-off spectroscopy, with a requirement for higher optical power for illumination, this is not adequate (Kendziora et al., "Infrared photothermal imaging spectroscopy for detection of trace explosives on surfaces," Applied Optics, 54(31), F129-F138 (2015); Kendziora et al., "Photothermal Methods for Laser-Based Detection of Explosives" in [Laser-Based Optical Detection of Explosives (Devices, Circuits, and Systems)] edited by Paul M. Pellegrino, Ellen L. Holthoff, and Mikella E. Farrell, CRC Press, (2015); Furstenberg et al., "Characterization and control of tunable quantum cascade laser beam parameters for stand-off detection," Proc. SPIE, 9824, 9824-21 (2016); Kendziora et al., "Broad-band infrared imaging spectroscopy for standoff detection of trace explosives," Proc. SPIE, 9836, 9836-87 (2016); Grosser et al., "Modeling of the heat transfer in laser-heated small particles on surfaces," International Journal of Heat and Mass Transfer, 55, 8038 (2012); Kendziora et al., "Infrared photothermal imaging for standoff detection applications" Proc. SPIE Vol. 8373, 83732H (2012); Kendziora et al., "Advances in stand-off detection of trace explosives by infrared photo-thermal imaging," Proc. SPIE, 7664, 76641j (2010); Furstenberg et al., "Stand-off detection of trace explosives via resonant infrared photothermal imaging" Appl. Phys. Lett., 93 (22), (2008); Kendziora et al., "Infrared photothermal imaging of trace explosives on relevant substrates," Proc. SPIE, 8709, 870900 (2013); Papantonakis et al., "Stand-off detection of trace explosives by infrared photothermal imaging" Proc. SPIE Vol. 7304, 730418 (2009); Furstenberg et al., "Stand-off detection of trace explosives by infrared photo-thermal spectroscopy," 2009 IEEE Conference on Technologies for Homeland Security (HST), 465-71 (2009); and Furstenberg et al., "Trace explosives detection using photo-thermal infrared imaging spectroscopy (PT-IRIS): theory, modeling, and detection algorithms," Proc. SPIE, 9455, 945501 (2015)).

BRIEF SUMMARY OF THE INVENTION

The present invention provides a speckle reduction instrument and method for reducing speckle for a variety of applications, including standoff detection. It provides a device and method for reducing coherence of laser (especially infrared) light without significant loss of laser power. With this invention, laser light that is highly coherent is converted into less-coherent but still bright light suitable for illumination in microscopes and other devices. This achieves significant improvement in image quality in imaging applications, including microscopy.

Infrared (IR) microscopes that use IR lasers for illumination produce "noisy" images due to speckle effects. Conventional methods for speckle reduction don't provide enough brightness for imaging. When a wavefront encounters a rough surface, it gets distorted, following the Huygens principle. This can be exploited for making incoherent light.

All high resolution IR imaging techniques that require high-brightness sources for illumination would benefit from this invention.

The speckle reduction device of the present invention has a parabolic reflector and flat mirror that form a cavity. Diffused laser light bounces back and forth between the parabolic reflector and the flat mirror. All diffused light is collected and bounced around the cavity. The laser will effectively hit the diffuser surface multiple times, which improves de-speckling performance. Ideally, the cavity should be slightly de-tuned so consecutive reflections hit different parts of the diffuser.

There are several advantages with the present invention. It provides higher optical throughput (efficiency) than current methods. It has an adjustable control of the amount of decoherence (trade-off between laser power and level of decoherence). It results in more useful (collimated) incoherent light. Unlike in an integrating sphere, rays stay close to on-axis. The cavity design allows multiple passes leading to increased speckle reduction. A slightly defocusing laser spot increases the diffuser area seen by the laser spot providing more chances to de-cohere.

These and other features and advantages of the invention, as well as the invention itself, will become better understood by reference to the following detailed description, appended claims, and accompanying drawings.

BRIEF DESCRIPTION OF THE DRAWINGS

FIG. 2B is an illustration of speckle pattern formation modeling.

DETAILED DESCRIPTION OF THE INVENTION

Figure 1:
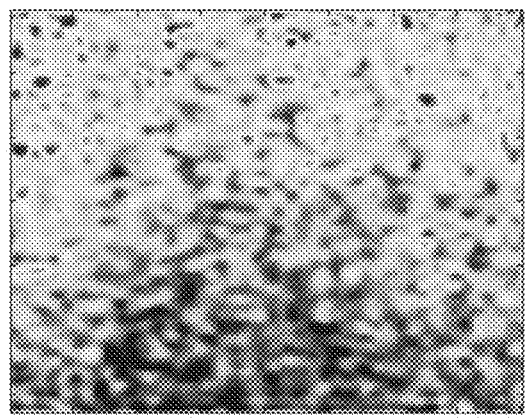
FIG. 1 shows a typical speckle pattern.
Figure 2A:
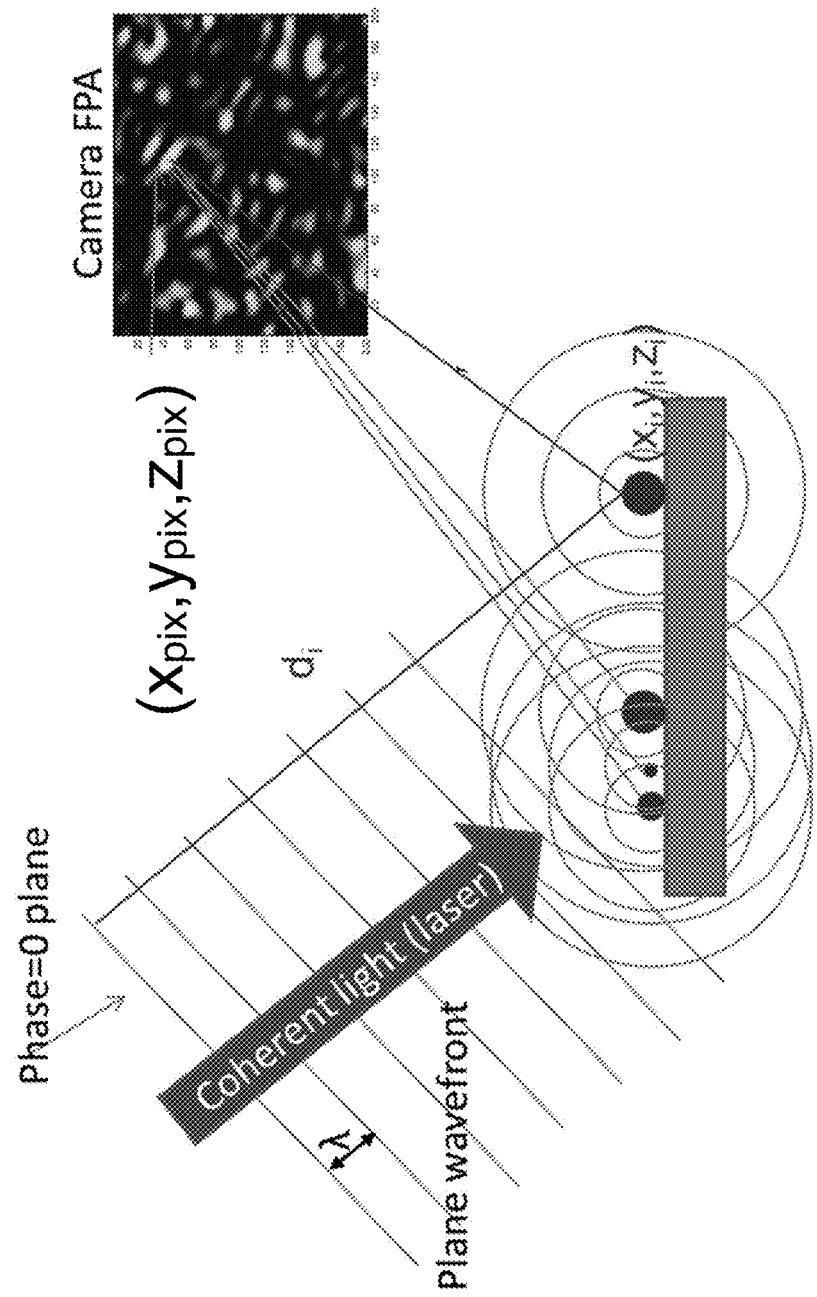
FIG. 2A is an illustration of speckle pattern formation.
Figure 3:
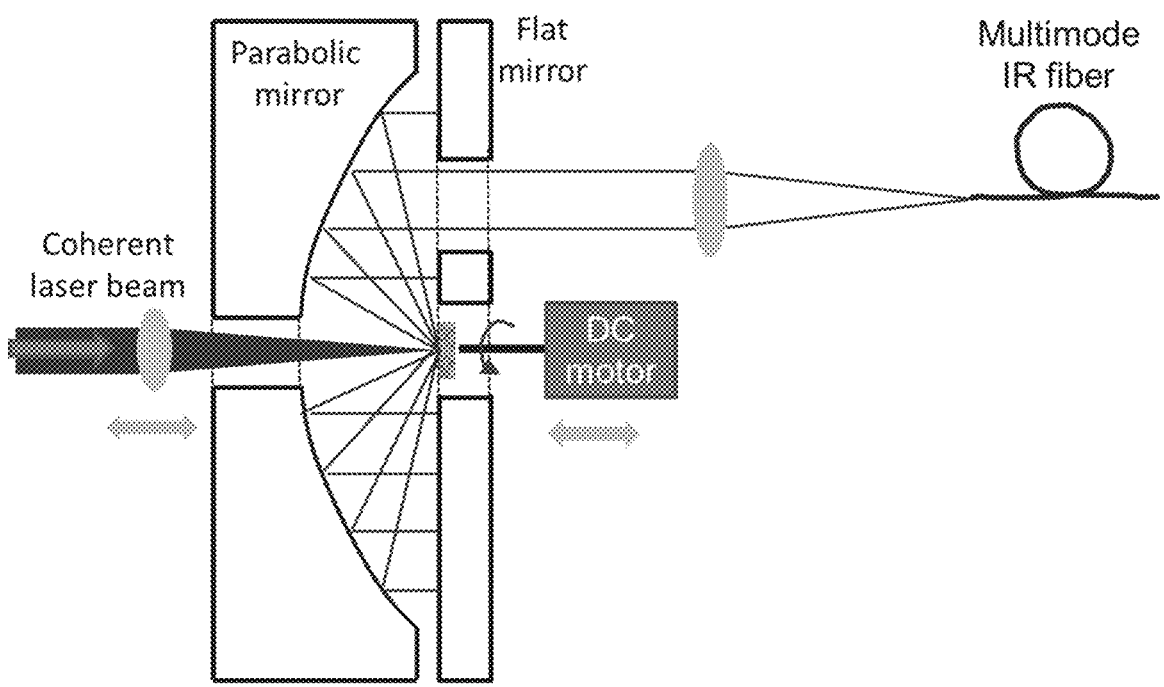
FIG. 3 is a schematic design of a high-throughput de-speckling unit.

The prevent invention relates to speckle reduction and a high optical throughput speckle reduction device. To increase the throughput, a cavity-based unit (see FIG. 3) was designed that captures most of the hemispheric diffused reflectance emitted by the diffuser. One mirror in the cavity has a parabolic profile and collimates all collected rays towards a flat mirror. This flat mirror has a central opening where a spinning disk diffuser is inserted. The parabolic mirror also has a central hole through which the incoming laser beam is focused onto the diffuser. Another off-center hole in the flat mirror allows a certain percentage of light to exit the unit with each pass in the cavity. This light is either coupled into an optical fiber or used free-space. Slightly defocusing the incoming laser beam or moving the spinning disk away from the plane of the flat mirror allows for control of the amount of speckle reduction and optical throughput the unit can provide.

The diffuser may be moved with respect to the incoming laser beam by means other than spinning or in combination with spinning. Some examples include oscillating, vibrating, and using a motion stage, such as a piezo-driven motion stage. This will promote speckle pattern averaging.

The design on the speckle reduction device allows for easy alignment due to its on-axis design. To use it, the incoming IR laser beam is focused on the diffuse surface that is passed through the central hole in the flat mirror. The diffuse piece (can be disk shaped) is in turn attached to a motor that is spinning. By slightly defocusing the IR laser spot and/or retracting or pushing forward (with respect to the reflective surface of the flat mirror), it is possible to tune the amount of de-speckling performance (at the expense of reduced throughput). Another way is to move the focused spot away from the center of the diffuser (either in addition to defocusing or with the focused spot). The output hole of the flat mirror (a ½" hole was used) is where the de-speckled light exits. It can be used in a free-space configuration or focused (by a suitable optic) into a multi-mode optical fiber. The focal point of this optic should be selected to match the input numerical aperture (NA) of the fiber. The NA of the de-speckling unit is given by the focal point of the de-speckling unit (0.625" was used in one design, but this can be tailored as needed) and the exit hole.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A speckle reduction device, comprising:
    a coherent laser input beam;
    a parabolic reflector with a central hole;
    a flat mirror with a central hole and an output hole;
    a cavity between the parabolic reflector and the flat mirror;
    a moving, reflective diffuser; and
    a partially coherent laser exit beam;
    wherein the coherent laser input beam passes through the central hole of the parabolic reflector and the central hole of the flat mirror and is focused onto the moving, reflective diffuser, wherein, reflected diffused laser light bounces around the cavity back and forth between the parabolic reflector and the flat mirror contacting the moving, reflective diffuser multiple times, and wherein the partially coherent laser exit beam passes through the output hole of the flat mirror.

2. The speckle reduction device of claim 1, wherein the moving, reflective diffuser is located within the central hole of the flat mirror.

3. The speckle reduction device of claim 1, wherein the moving, reflective diffuser is placed out of the plane of the flat mirror.

4. The speckle reduction device of claim 1, wherein the moving, reflective diffuser is placed off-axis with respect to the optical axis of the parabola but still catching the coherent laser input beam.

5. The speckle reduction device of claim 1, wherein the moving, reflective diffuser is a spinning diffuser.

6. The speckle reduction device of claim 1, wherein the moving, reflective diffuser is moved with respect to the laser input beam by means other than spinning or in combination with spinning.

7. The speckle reduction device of claim 1, wherein the coherent laser input beam is partially defocused.

8. The speckle reduction device of claim 1, wherein the partially coherent laser exit beam is coupled into an optical fiber.

9. A method of reducing speckle, comprising:
    passing a coherent laser input beam through a central hole of a parabolic reflector and a central hole of a flat mirror; and focusing the coherent laser input beam onto a moving, reflective diffuser, wherein reflected, diffused laser light bounces back and forth between the parabolic reflector and the flat mirror contacting the moving, reflective diffuser multiple times, and wherein a partially coherent laser exit beam passes through an output hole in the flat mirror.

10. The method of claim 9, wherein the moving, reflective diffuser is located within the central hole of the flat mirror.

11. The method of claim 9, wherein the moving, reflective diffuser is placed out of the plane of the flat mirror.

12. The method of claim 9, wherein the moving, reflective diffuser is placed off-axis with respect to the optical axis of the parabola but still catching the coherent laser input beam.

13. The method of claim 9, wherein the moving, reflective diffuser is a spinning diffuser.

14. The method of claim 9, wherein the moving, reflective diffuser is moved with respect to the laser input beam by means other than spinning or in combination with spinning.

15. The method of claim 9, wherein the coherent laser input beam is partially defocused.

16. The method of claim 9, wherein the partially coherent laser exit beam is coupled into an optical fiber.

* * * * *